(12) United States Patent
Kuriyama et al.

(10) Patent No.: US 12,457,135 B2
(45) Date of Patent: Oct. 28, 2025

(54) WIRELESS COMMUNICATION METHOD, WIRELESS COMMUNICATION SYSTEM, AND TRANSMITTER

(71) Applicant: NTT, Inc., Tokyo (JP)

(72) Inventors: Keita Kuriyama, Musashino (JP);
Hayato Fukuzono, Musashino (JP);
Masafumi Yoshioka, Musashino (JP);
Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 43 days.

(21) Appl. No.: 18/686,892

(22) PCT Filed: Aug. 27, 2021

(86) PCT No.: PCT/JP2021/031602
§ 371 (c)(1),
(2) Date: Feb. 27, 2024

(87) PCT Pub. No.: WO2023/026492
PCT Pub. Date: Mar. 2, 2023

(65) Prior Publication Data
US 2024/0356787 A1 Oct. 24, 2024

(51) Int. Cl.
*H04L 25/03* (2006.01)
*H04B 7/0456* (2017.01)
(52) U.S. Cl.
CPC ..... *H04L 25/03343* (2013.01); *H04B 7/0456* (2013.01); *H04L 2025/03585* (2013.01)

(58) Field of Classification Search
CPC ............. H04L 5/0053; H04L 25/03343; H04L 5/0048; H04L 5/0023; H04L 5/0051;
(Continued)

(56) References Cited

U.S. PATENT DOCUMENTS 9,553,646 B1 * 1/2017 Zhou .................. H04L 25/0202
2013/0308960 A1 * 11/2013 Horikoshi .......... H03H 21/0012
398/209
(Continued)

OTHER PUBLICATIONS

Ibnkahla et al., "High-Speed Satellite Mobile Communications: Technologies and Challenges", Proceedings of the IEEE, vol. 92, No. 2, Feb. 2004, pp. 312-339.
(Continued)

*Primary Examiner* — Eva Y Puente
(74) *Attorney, Agent, or Firm* — XSENSUS LLP

(57) ABSTRACT

A wireless communication method according to an embodiment includes precoding a stream of a transmission signal in a time domain by using an FIR filter, controlling a transmission power of the precoded stream, amplifying the precoded stream such that the controlled transmission power is obtained; and performing control for changing a tap length in precoding such that the tap length is decreased in a case where a magnitude of a last tap coefficient in precoding is small and the tap length is increased in a case where the magnitude is large, with respect to a threshold value calculated on the basis of quality information of a received signal fed back from a reception device that has received the amplified stream or quality information of a received signal calculated by using at least characteristics of an amplifier.

6 Claims, 8 Drawing Sheets

(58) Field of Classification Search
CPC ............... H04L 1/0026; H04L 5/0035; H04L 2025/03414; H04B 7/0456; H04B 7/0452; H04B 7/024; H04B 7/0639; H04B 7/0413; H04B 7/0617; H04B 7/0626; H04B 7/0417; H04B 7/0671; H04B 7/0478; H04B 7/0481; H04B 7/0479; H04B 7/0632; H04W 72/23; H04W 72/0446; H04W 80/08; H04W 88/085; H04W 72/1263; H04W 72/1273; H04W 72/232; H04W 84/14; H04W 92/12; H04W 72/231; H04W 24/02; H04W 72/04; H04W 72/044

See application file for complete search history.

(56) References Cited

U.S. PATENT DOCUMENTS

| | | | | |
|---|---|---|---|---|
| 2016/0087696 A1* | 3/2016 | Pani | ...................... | H04B 7/0639 370/329 |
| 2019/0020435 A1* | 1/2019 | Nishimoto | ........... | H04J 11/0036 |
| 2019/0097700 A1* | 3/2019 | Zhu | ....................... | H04L 1/0003 |

OTHER PUBLICATIONS

Kuriyama et al., "FIR-type Transmit Beamforming for Wide-band Single Carrier MIMO Transmission", The Institute of Electronics, Information and Communication Engineers, IEICE Technical Report, Jan. 2019, pp. 31-36 (6 pages including English abstract).

\* cited by examiner

TRANSMISSION CONSTELLATION
(e.g.: 64QAM)

LINEAR REGION
(ABSENCE OF DISTORTION)

NON-LINEAR REGION
(PRESENCE OF DISTORTION)

WIRELESS COMMUNICATION METHOD, WIRELESS COMMUNICATION SYSTEM, AND TRANSMITTER

CROSS-REFERENCE TO RELATED APPLICATIONS

This application is a national stage application, pursuant to 35 U.S.C. § 371, of International Patent Application No. PCT/JP2021/031602, filed Aug. 27, 2021, the entire contents of which are incorporated herein by reference.

TECHNICAL FIELD

The present invention relates to a wireless communication method, a wireless communication system, and a transmission device.

BACKGROUND ART

For example, in a wireless communication system of a single-carrier multi-level modulation system, when an excessive transmission power is input to an amplifier of a transmission device, distortion occurs in a signal. Therefore, communication is generally performed with a transmission power amplified in a linear region where no distortion occurs.

On the other hand, when a large peak power is generated, the peak power may be amplified in a non-linear region of an amplifier, and the communication quality may deteriorate due to non-linear distortion (refer to, for example, Non Patent Literature 1).

In a single-carrier system (refer to, for example, Non Patent Literature 2) that performs precoding in a time domain by using an FIR filter, a tap length in the precoding is a fixed value.

CITATION LIST

Non Patent Literature

Non Patent Literature 1: MOHAMED IBNKAHLA, et al., "High-Speed Satellite Mobile Communications: Technologies and Challenges", PROCEEDINGS OF THE IEEE, VOL. 92, NO. 2, February 2004, p. 312-339

Non Patent Literature 2: Keita Kuriyama, Hayato Fukuzono, Masafumi Yoshioka, Tsutomu Tatsuta, "FIR-type Transmit Beamforming for Wide-band Single Carrier MIMO Transmission", The Institute of Electronics, Information and Communication Engineers, IEICE Technical Report, January 2019, p. 31-36

SUMMARY OF INVENTION

Technical Problem

For example, in a single-carrier system that performs precoding in a time domain by using an FIR filter, in a case where a tap length in the precoding is fixed to M, a difference in magnitude occurs in an m-th tap coefficient depending on a channel state.

In a case where the m-th tap coefficient is very small, the tap length in the precoding may be excessive with respect to the tap length necessary for obtaining desired bit error rate (BER) characteristics. In this case, a peak to average power ratio (PAPR) is increased more than necessary by excessive weight multiplication, and there is a possibility of being affected by non-linear distortion.

On the other hand, in a case where the m-th tap coefficient is very large, the tap length may be insufficient, and inter-stream interference and inter-symbol interference may increase.

The present invention has been made in view of the above-described problems, and an object thereof is to provide a wireless communication method, a wireless communication system, and a transmission device capable of improving the quality of wireless communication even when a channel state varies.

Solution to Problem

According to an aspect of the present invention, there is provided a wireless communication method of transmitting a signal from a transmission device to a reception device, including a precoding step of precoding a stream of a transmission signal in a time domain by using an FIR filter; a transmission power control step of controlling a transmission power of the precoded stream; an amplification step of amplifying the precoded stream such that the controlled transmission power is obtained; and a tap length control step of performing control for changing a tap length in the precoding step such that the tap length is decreased in a case where a magnitude of a last tap coefficient in the precoding step is small and the tap length is increased in a case where the magnitude is large, with respect to a threshold value calculated on the basis of quality information of a received signal fed back from the reception device that has received the amplified stream or quality information of a received signal calculated by using at least characteristics of an amplification unit of the transmission device.

According to another aspect of the present invention, there is provided a wireless communication system that transmits a signal from a transmission device to a reception device, including a precoding unit that precodes a stream of a transmission signal in a time domain by using an FIR filter; a transmission power control unit that controls a transmission power of the stream precoded by the precoding unit; an amplification unit that amplifies the stream precoded by the precoding unit under control of the transmission power control unit; and a tap length control unit that performs control for changing a tap length in the precoding unit such that the tap length is decreased in a case where a magnitude of a last tap coefficient in the precoding unit is small and the tap length is increased in a case where the magnitude is large, with respect to a threshold value calculated on the basis of quality information of a received signal fed back from the reception device that has received the stream by the amplification unit or quality information of a received signal calculated by using at least characteristics of the amplification unit.

According to still another aspect of the present invention, there is provided a transmission device including a precoding unit that precodes a stream of a transmission signal in a time domain by using an FIR filter; a transmission power control unit that controls a transmission power of the stream precoded by the precoding unit; an amplification unit that amplifies the stream precoded by the precoding unit under control of the transmission power control unit; and a tap length control unit that performs control for changing a tap length in the precoding unit such that the tap length is decreased in a case where a magnitude of a last tap coefficient in the precoding unit is small and the tap length is increased in a case where the magnitude is large, with respect to a threshold value calculated on the basis of quality information of a received signal fed back from the reception device that has received the stream amplified by the amplification unit or quality information of a received signal calculated by using at least characteristics of the amplification unit.

Advantageous Effects of Invention

According to the present invention, it is possible to improve quality of wireless communication even when a channel state varies.

DESCRIPTION OF EMBODIMENTS

Figure 1:
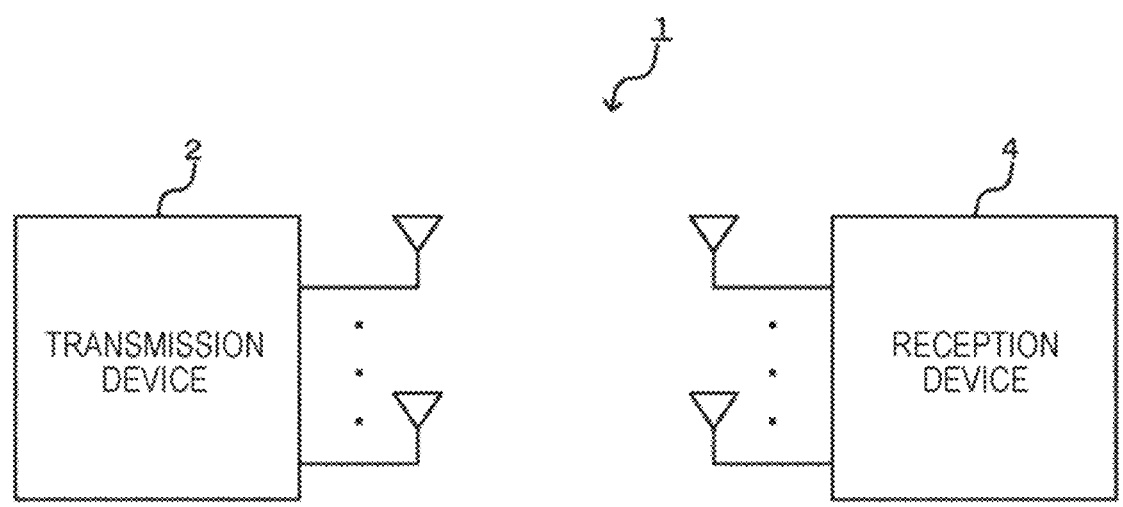
FIG. 1 is a diagram illustrating a configuration example of a wireless communication system according to an embodiment.

Hereinafter, an embodiment of a wireless communication system will be described with reference to the drawings. FIG. 1 is a diagram illustrating a configuration example of a wireless communication system 1 according to the embodiment. As illustrated in FIG. 1, the wireless communication system 1 is, for example, a multiple input multiple output (MIMO) system in which a transmission device 2 performs MIMO transmission to a reception device 4.

Although the MIMO system is described as an example here, the wireless communication system according to an embodiment is not limited to a MIMO system, and may be a single input single output (SISO) system or the like as long as it is a system that performs precoding using a finite impulse response (FIR) filter.

The transmission device 2 includes a plurality of antennas, precodes multiple streams of a transmission signal in a time domain, and performs MIMO transmission to the reception device 4. The transmission device 2 transmits a training signal for calculating communication path information (for example, channel state information (CSI)) to the reception device 4.

The reception device 4 receives the multiple streams transmitted by the transmission device 2, and feeds quality information of a received signal back to the transmission device 2. The quality information of the received signal fed back from the reception device 4 to the transmission device 2 includes, for example, a channel quality indicator (CQI), a precoding matrix indicator (PMI), and the like. Further, the reception device 4 calculates communication path information by using the received training signal, and transmits the calculated communication path information to the transmission device 2.

Note that the communication path information may be known or unknown to the transmission device 2. The transmission device 2 and the reception device 4 may have the same function to perform transmission and reception.

Figure 2:
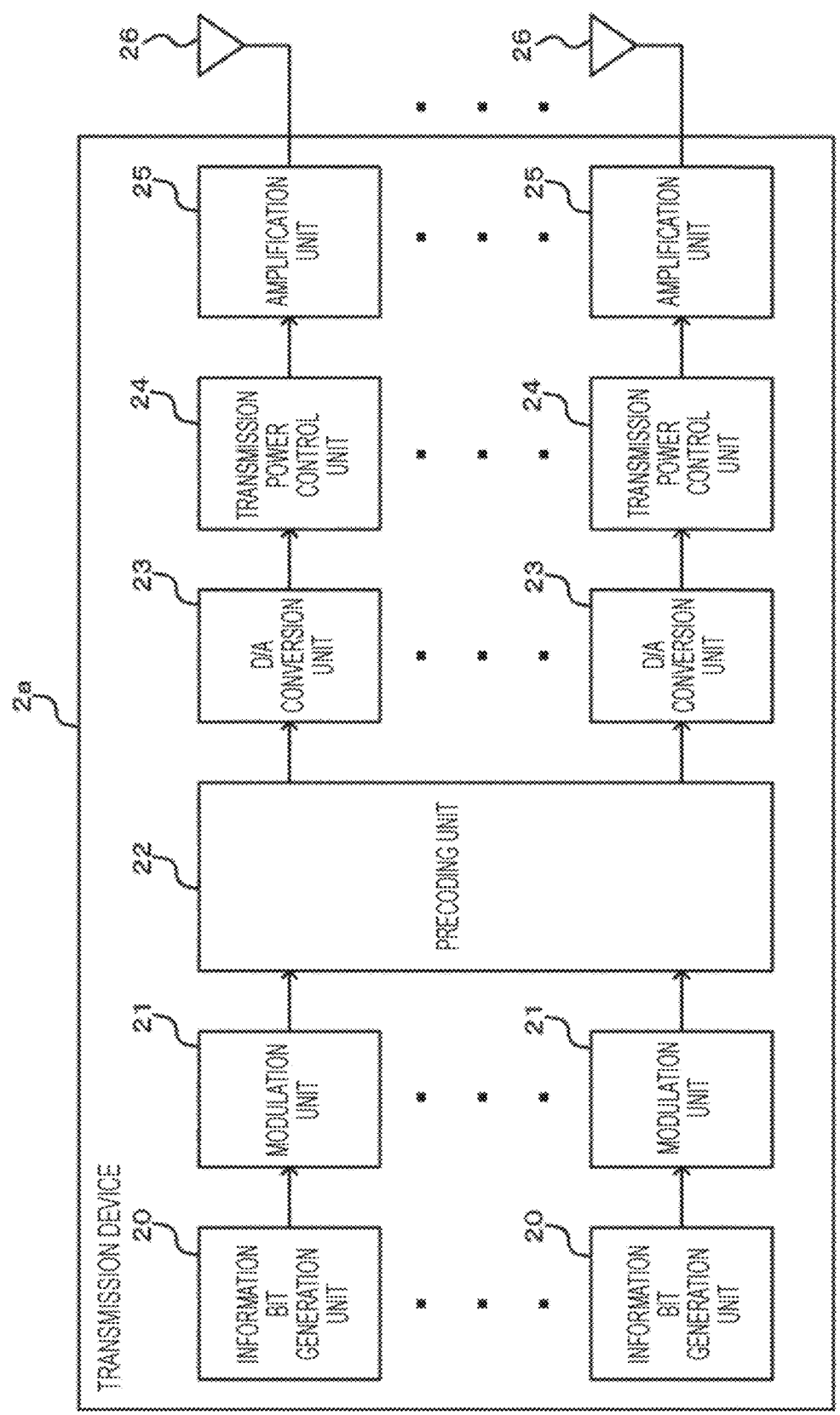
FIG. 2 is a functional block diagram exemplifying functions of a transmission device of a comparative example.

Here, in order to facilitate understanding of the configuration of the transmission device according to the embodiment, a configuration example of a transmission device 2a of a comparative example will be described. FIG. 2 is a functional block diagram illustrating functions of the transmission device 2a of the comparative example.

As illustrated in FIG. 2, the transmission device 2a of the comparative example includes a plurality of information bit generation units 20, a plurality of modulation units 21, a precoding unit 22, a plurality of D/A conversion units 23, a plurality of transmission power control units 24, a plurality of amplification units 25, and a plurality of antennas 26. Note that the transmission device 2a can configure the wireless communication system 1 instead of the transmission device 2 illustrated in FIG. 1.

Each of the information bit generation units 20 generates an information bit (data signal) that will be a transmission signal, and outputs the information bit to the modulation unit 21. Each data signal generated by the information bit generation unit 20 serves as a stream.

Each of the modulation units 21 modulates the data signal input from the information bit generation unit 20 according to a predetermined modulation method, and outputs the modulated data signal to the precoding unit 22. Examples of the modulation method include quadrature phase shift keying (QPSK) in which one symbol has four values, quadrature amplitude modulation (16QAM) in which one symbol has 16 values, and 64QAM in which one symbol has 64 values.

The precoding unit 22 precodes multiple streams of a data signal (transmission signal) in the time domain by using an FIR filter and outputs the respective precoded streams to the plurality of D/A conversion units 23. When precoding unit 22 performs precoding, a PAPR increases.

Each of the D/A conversion units 23 performs D/A conversion on the stream input from the precoding unit 22, and outputs the converted stream to the transmission power control unit 24.

Each of the transmission power control units 24 controls the transmission power of the stream input from the D/A conversion unit 23 and outputs the stream to the amplification unit 25. That is, the plurality of transmission power control units 24 respectively control the transmission powers of the multiple streams precoded by the precoding units 22.

The plurality of amplification units 25 respectively amplify the multiple streams precoded by the precoding units 22 according to the control of the transmission power control units 24, and radiate the multiple streams via the antenna 26.

Figure 3A:
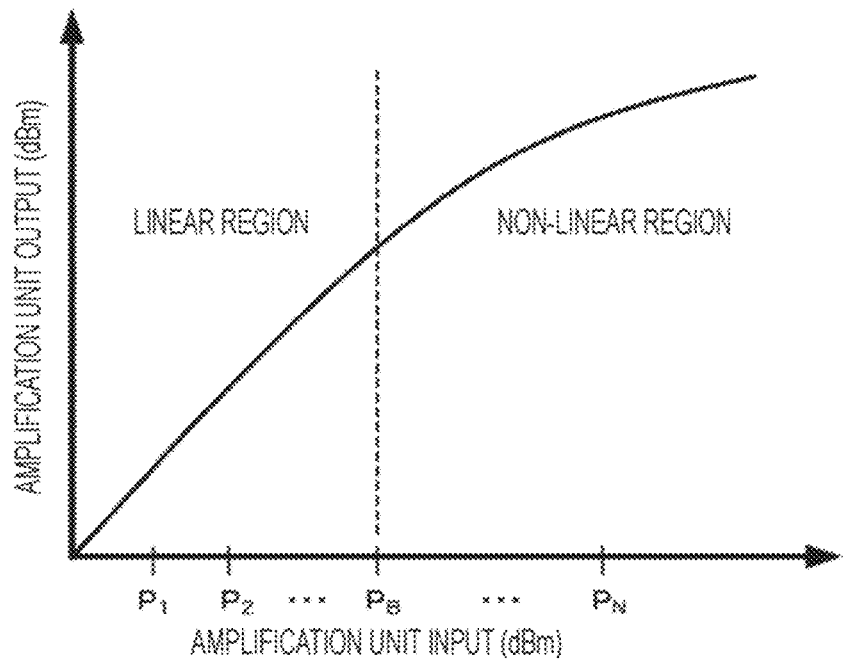
FIG. 3A is a graph exemplifying amplification characteristics of an amplification unit.
Figure 3B:
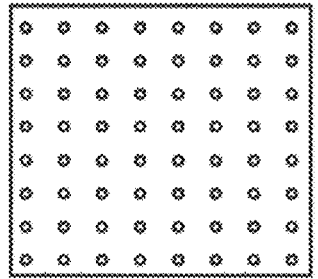
FIG. 3B is a diagram exemplifying a constellation of a transmission signal amplified by the amplification unit.
Figure 3B:
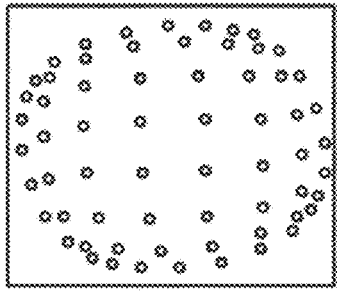

FIG. 3 is a diagram illustrating amplification characteristics of the amplification unit 25. FIG. 3($a$) is a graph exemplifying amplification characteristics of the amplification unit 25. FIG. 3($b$) is a diagram exemplifying a constellation of a transmission signal amplified by the amplification unit 25.

As illustrated in FIG. 3($a$), the amplification unit 25 has a linear region in which an input is amplified and output in proportion to the input, and a non-linear region in which an excessive input is nonlinearly amplified.

As illustrated in FIG. 3(b), no distortion occurs in a transmission constellation in a case where the amplification unit 25 amplifies a data signal in the linear region, but distortion occurs in a transmission constellation in a case where the amplification unit 25 amplifies a data signal in the non-linear region. When distortion occurs in the transmission constellation, streams are not orthogonal to each other, and inter-stream interference occurs.

Figure 4:
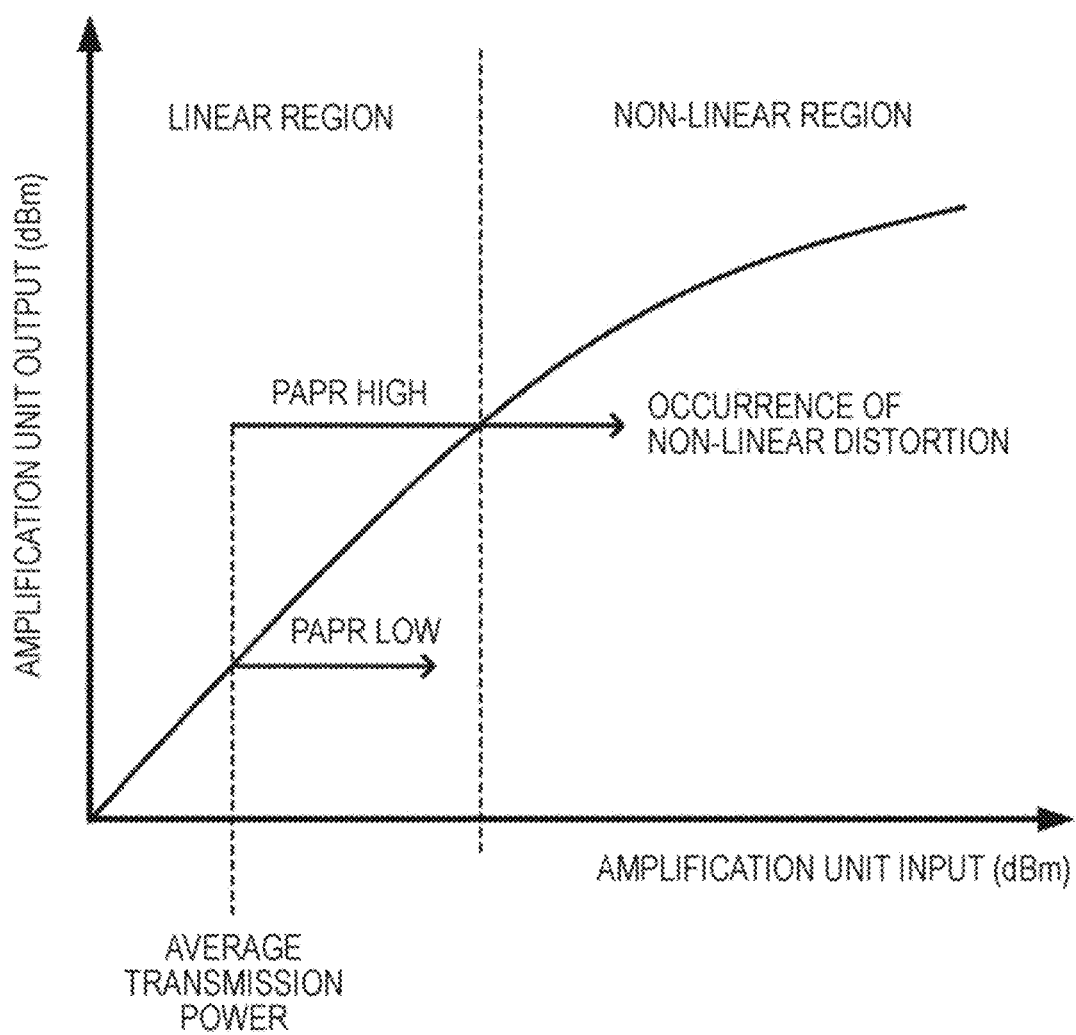
FIG. 4 is a graph exemplifying a relationship between amplification characteristics of the amplification unit and a magnitude of a PAPR.

FIG. 4 is a graph exemplifying a relationship between the amplification characteristics of the amplification unit 25 and a magnitude of the PAPR. Even if an average transmission power input to the amplification unit 25 is the same, when the PAPR is high, a larger peak power is generated than when the PAPR is low.

In a case where a transmission signal having the same average transmission power is input to the amplification unit 25, even if a transmission signal is always amplified in the linear region when the PAPR is low, a transmission signal may be amplified in the non-linear region when the PAPR is high, and thus non-linear distortion may occur in the transmission constellation.

Therefore, a transmission device of a wireless communication system according to an embodiment that will be described later is configured to be able to control a tap length in precoding such that the quality of wireless communication can be improved even if a channel state varies.

When a channel state changes, a tap coefficient changes. For example, a transfer function between an $n_t$-th transmission antenna and an $n_r$-th reception antenna in a case where a CIR length is L is expressed by the following Formula (1).

[Math. 1]

$$H_{n_r n_t}(z) = \sum_{l=0}^{L-1} h_{n_r,n_t}^{(l)} z^{-l} \quad (1)$$

Further, a transfer function of an FIR filter between an $s_t$-th transmission stream and an $n_t$-th transmission antenna is expressed by the following Formula (2).

[Math. 2]

$$W_{n_t s_t}(z) = \sum_{m=0}^{M-1} w_{n_t,s_t}^{(m)} z^{-m} \quad (2)$$

Here, when L<M and the following Formula (3) is established, a magnitude of the tap coefficient shown in the following Formula (4) is small, and the tap length may be excessive.

[Math. 3]

$$\left|h_{n_r,n_t}^{(L-1)}\right| \approx 0 \quad (3)$$

[Math. 4]

$$\left|w_{n_t,s_t}^{(M-1)}\right| \quad (4)$$

When L>M and the following Formula (5) is established, a magnitude of the tap coefficient shown in the above Formula (4) is large, and the tap length may be insufficient.

[Math. 5]

$$\left|h_{n_r,n_t}^{(L-1)}\right| \gg 0 \quad (5)$$

Figure 5:
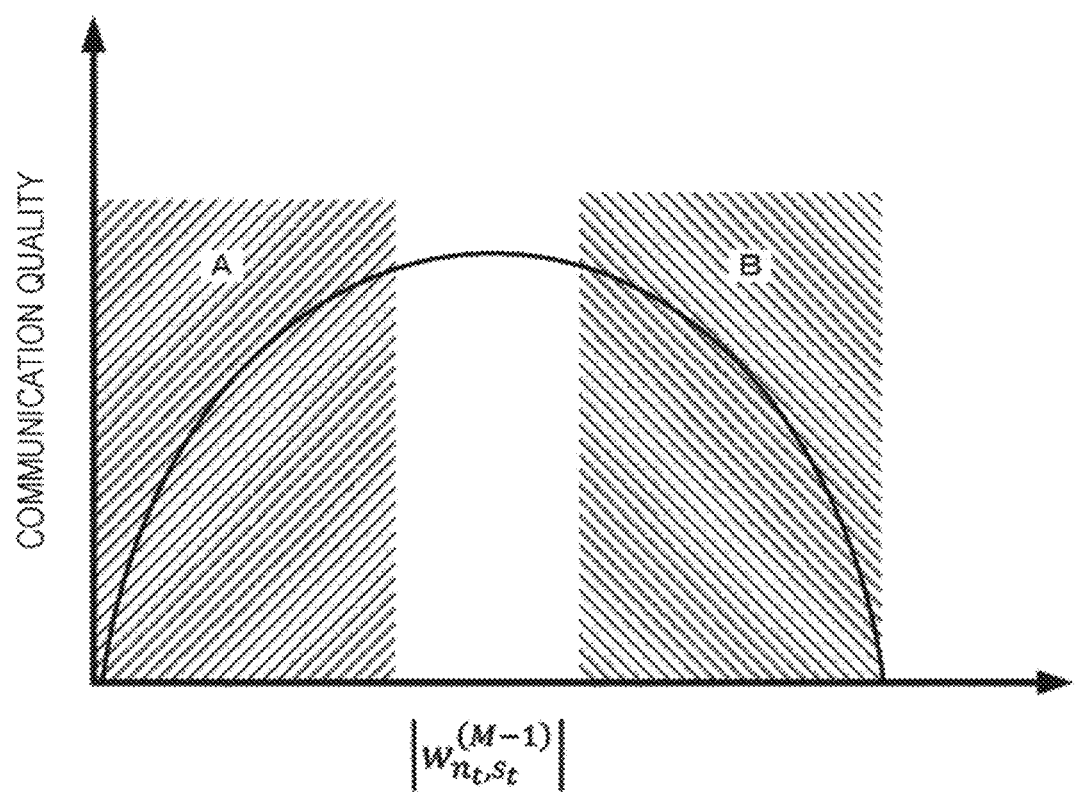
FIG. 5 is a graph illustrating communication quality with respect to a magnitude of a tap coefficient in precoding.

FIG. 5 is a graph illustrating a communication quality with respect to a magnitude of a tap coefficient in precoding. Here, a region A illustrated in FIG. 5 is a region in which and the quality degradation due to nonlinear distortion caused by a small magnitude of the tap coefficient and a high PAPR is dominant. A region B is a region in which quality degradation due to inter-stream interference and inter-symbol interference caused by a large magnitude of the tap coefficient and an insufficient tap length is dominant.

That is, even if the tap coefficient is too small or too large, the communication quality deteriorates. Therefore, the transmission device of the wireless communication system according to an embodiment is configured to provide a threshold value α for the magnitude of the tap coefficient and control the tap length in the precoding by using the threshold value α.

Figure 6:
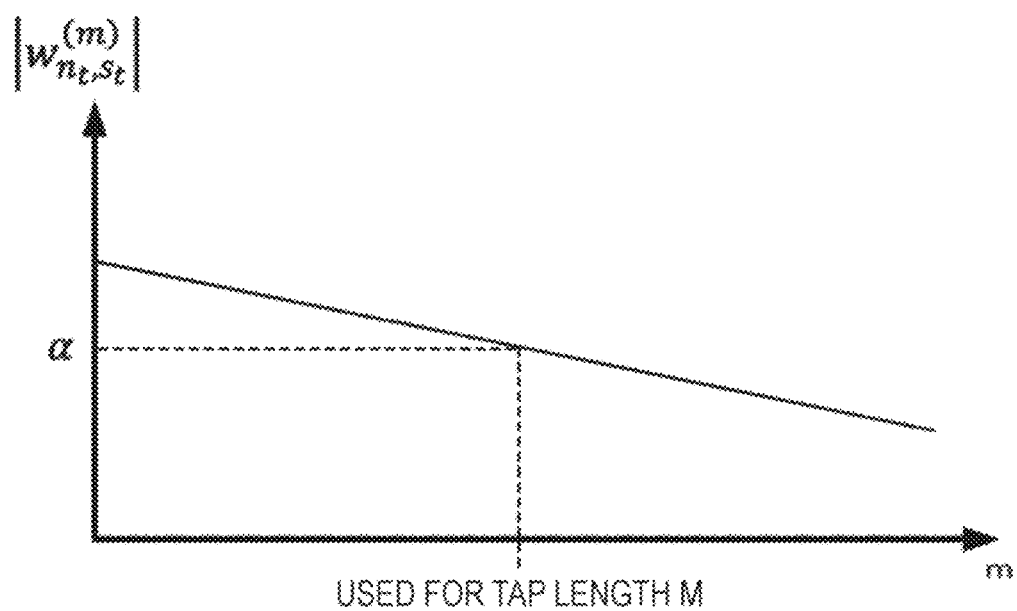
FIG. 6 is a diagram illustrating a relationship between a threshold value α used by the transmission device according to the embodiment and a tap length M used for precoding.

FIG. 6 is a diagram illustrating a relationship between the threshold value α used by the transmission device according to the embodiment and the tap length M used for precoding. In the wireless communication system 1, the threshold value α may be determined while measuring the reception quality before communication, or may be updated during communication. In the wireless communication system 1, the threshold value α may be determined in advance on the basis of a system design value (characteristics of the amplification unit 25 used by the transmission device 2, desired BER characteristics, or the like).

For example, the transmission device according to the embodiment provides the threshold value α for a magnitude of the tap coefficient shown in the following Formula (6), calculates the maximum m that satisfies the following Formula (7), and uses m+1 as the tap length M.

[Math. 6]

$$\left|w_{n_t,s_t}^{(m)}\right| \quad (6)$$

[Math. 7]

$$\left|w_{n_t,s_t}^{(m)}\right| \geq \alpha_0 \quad (7)$$

The transmission device according to the embodiment may determine the tap length M by calculating the minimum m that satisfies the following Formula (8).

[Math. 8]

$$\left|w_{n_t,s_t}^{(m)}\right| < \alpha_0 \quad (8)$$

The transmission device according to the embodiment may determine the tap length by using the value shown in the following Formula (9) or a magnitude of a tap coefficient converted into another manageable form instead of using the magnitude of the tap coefficient shown in the above Formula (4).

[Math. 9]

$$|w_{n_t,s_t}^{(m)}|^2 \quad (9)$$

For example, the transmission device according to the embodiment may, instead of using the magnitude of the tap coefficient without any change, perform normalization with, for example, the maximum tap coefficient as shown in the following Formula (10) and determine a threshold value for a relative value or the like.

[Math. 10]

$$\alpha_{n_t,s_t}^{(m)} = \log_{10} \frac{|w_{n_t,s_t}^{(m)}|}{\max|w_{n_t,s_t}^{(m)}|} \quad (10)$$

Figure 7:
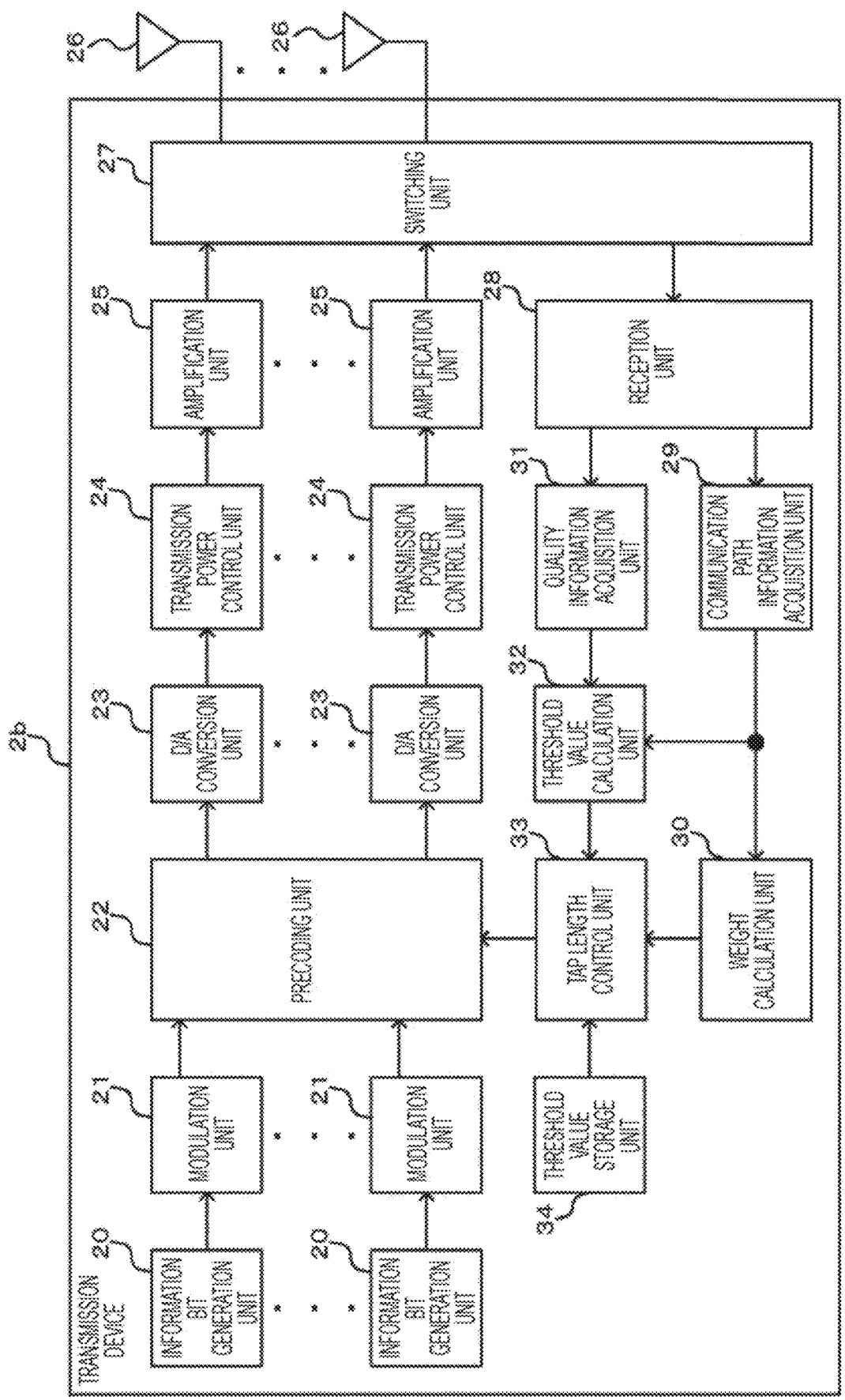
FIG. 7 is a functional block diagram illustrating functions of the transmission device according to the embodiment.

Next, a specific configuration example of a transmission device 2b according to an embodiment will be described. FIG. 7 is a functional block diagram exemplifying functions of the transmission device 2b according to the embodiment.

As illustrated in FIG. 7, the transmission device 2b according to the embodiment includes a plurality of information bit generation units 20, a plurality of modulation units 21, a precoding unit 22, a plurality of D/A conversion units 23, a plurality of transmission power control units 24, a plurality of amplification units 25, a plurality of antennas 26, a switching unit 27, a reception unit 28, a communication path information acquisition unit 29, a weight calculation unit 30, a quality information acquisition unit 31, a threshold value calculation unit 32, a tap length control unit 33, and a threshold value storage unit 34.

Note that, in the transmission device 2b illustrated in FIG. 7, substantially the same constituents as those of the transmission device 2a illustrated in FIG. 2 are denoted by the same reference numerals. The transmission device 2b can configure the wireless communication system 1 instead of the transmission device 2 illustrated in FIG. 1.

The switching unit 27 has a function of switching between transmission and reception performed via the antenna 26, transmits an output signal of the amplification unit 25 from the antenna 26, and outputs a signal received by the antenna 26 to the reception unit 28.

The reception unit 28 processes the signal received via the antenna 26, and outputs the processed signal to the communication path information acquisition unit 29 or the quality information acquisition unit 31.

The communication path information acquisition unit 29 acquires communication path information based on a training signal from the signal processed by the reception unit 28 for a communication path between the transmission device 2 and the reception device 4, and outputs the communication path information to the weight calculation unit 30 and the threshold value calculation unit 32.

The weight calculation unit 30 calculates a precoding weight for the precoding unit 22 for each communication path by using the communication path information acquired by the communication path information acquisition unit 29, and outputs the communication path information and the weight to the tap length control unit 33.

The quality information acquisition unit 31 acquires quality information from the signal processed by the reception unit 28, and outputs the quality information to the threshold value calculation unit 32. Note that the quality information includes an SNR or a BER acquired by the reception device 4 by using the training signal (known signal) transmitted by the transmission device 2, and includes the influence of non-linear distortion due to the amplification unit 25 of the transmission device 2 or inter-stream interference due to insufficient precoding.

The threshold value calculation unit 32 calculates the above threshold value α on the basis of the quality information acquired by the quality information acquisition unit 31, and outputs the threshold value α to the tap length control unit 33.

The tap length control unit 33 performs control for changing a tap length in the precoding unit 22 such that the tap length is decreased in a case where a magnitude of the last tap coefficient of the precoding unit 22 is small and the tap length is increased in a case where the magnitude is large with respect to the threshold value α calculated on the basis of the quality information of the reception signal fed back from the reception device 4 that has received the stream amplified by the amplification unit 25 or the quality information of the reception signal calculated by using at least the characteristics of the amplification unit 25.

The tap length control unit 33 may perform control for changing the tap length in the precoding unit 22 by using the threshold value α or the like stored in the threshold value storage unit 34 that will be described later. The tap length control unit 33 performs control for changing the tap length in the precoding unit 22 every time the weight calculation unit 30 calculates the precoding weight by using the communication path information. The threshold value storage unit 34 stores the threshold value α and the like calculated in advance according to the characteristics of the amplification unit 25 and the like, and outputs the threshold value to the tap length control unit 33 according to access from the tap length control unit 33.

Figure 8:
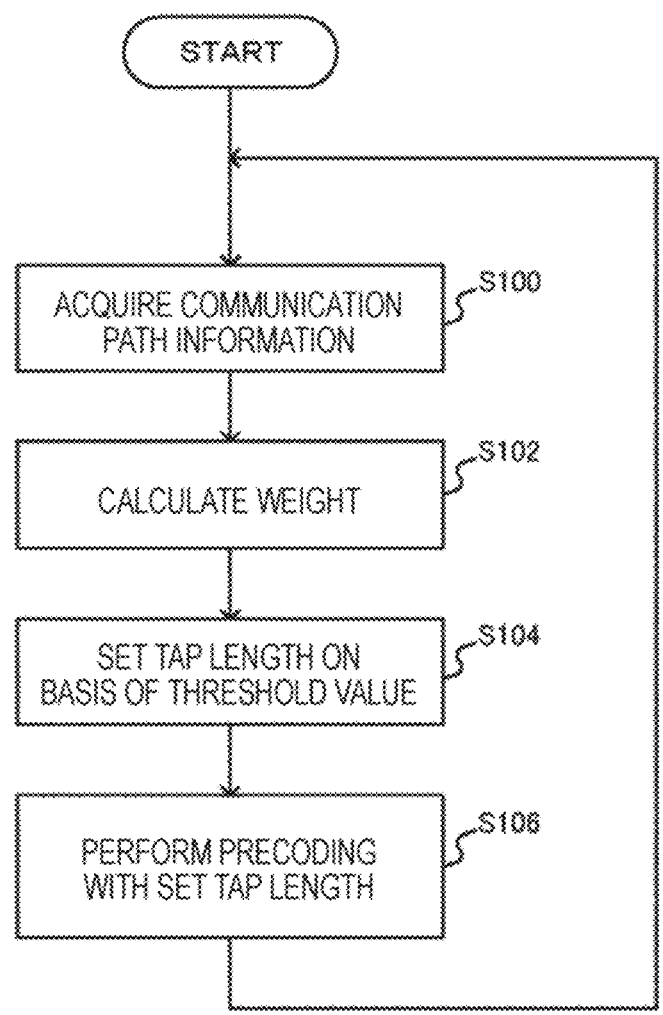
FIG. 8 is a flowchart illustrating an operation example of the transmission device according to the embodiment.

Next, an operation example of the transmission device 2b according to the embodiment will be described. FIG. 8 is a flowchart illustrating an operation example of the transmission device 2b according to the embodiment.

As illustrated in FIG. 8, in step 100 (S100), the transmission device 2b transmits a training signal to the reception device 4, and the communication path information acquisition unit 29 acquires the communication path information from the reception device 4.

In step 102 (S102), in the transmission device 2b, the weight calculation unit 30 calculates a precoding weight.

In step 104 (S104), in the transmission device 2b, the tap length control unit 33 sets a tap length in the precoding unit 22 on the basis of the threshold value α.

In step 106 (S106), the transmission device 2b performs precoding with the tap length set in the precoding unit 22, and returns to the process in S100.

As described above, since the transmission device 2b according to the embodiment controls the tap length on the basis of the threshold value, the quality of the wireless communication can be improved even if a channel state varies.

The reception device 4 illustrated in FIG. 1 may also perform processes and calculate a threshold value in a similar manner to the transmission device 2 according to amplification characteristics or the like in the reception device 4.

Note that some or all of the units configuring the transmission device 2b in the above embodiment may be configured by hardware, or may be configured by causing a processor to execute a program.

In a case where some or all of the units configuring the transmission device 2b are configured by causing a processor to execute a program, the program may be recorded in a recording medium and supplied, or may be supplied via a network.

REFERENCE SIGNS LIST

1 Wireless communication system
2, 2a, 2b Transmission device
4 Reception device
20 Information bit generation unit
21 Modulation unit
22 Precoding unit
23 D/A conversion unit
24 Transmission power control unit
25 Amplification unit
26 Antenna
27 Switching Unit
28 Reception unit
29 Communication path information acquisition unit
30 Weight calculation unit
31 Quality information acquisition unit
32 Threshold value calculation unit
33 Tap length control unit
34 Threshold value storage unit

The invention claimed is:

1. A wireless communication method of transmitting a signal from a transmission device to a reception device, the method comprising:
  precoding a stream of a transmission signal in a time domain by using an FIR filter;
  controlling a transmission power of the precoded stream;
  amplifying the precoded stream such that the controlled transmission power is obtained; and
  performing control for changing a tap length in precoding such that the tap length is decreased in a case where a magnitude of a last tap coefficient in precoding is small and the tap length is increased in a case where the magnitude is large, with respect to a threshold value calculated on the basis of quality information of a received signal fed back from the reception device that has received the amplified stream or quality information of a received signal calculated by using at least characteristics of an amplifier of the transmission device.

2. The wireless communication method according to claim 1, further comprising:
  acquiring communication path information based on a training signal for a communication path between the transmission device and the reception device; and
  calculating a precoding weight in precoding by using the communication path information, wherein
  in performing control, control for changing the tap length in precoding is performed each time a precoding weight is calculated by using the communication path information.

3. A wireless communication system that transmits a signal from a transmission device to a reception device, the wireless communication system comprising:
  a precoding circuitry configured to precode a stream of a transmission signal in a time domain by using an FIR filter;
  a transmission power control circuitry configured to control a transmission power of the stream precoded by the precoding circuitry;
  an amplifier that amplifies the stream precoded by the precoding circuitry under control of the transmission power control circuitry; and
  a tap length control circuitry configured to perform control for changing a tap length in the precoding circuitry such that the tap length is decreased in a case where a magnitude of a last tap coefficient in the precoding circuitry is small and the tap length is increased in a case where the magnitude is large, with respect to a threshold value calculated on the basis of quality information of a received signal fed back from the reception device that has received the stream amplified by the amplifier or quality information of a received signal calculated by using at least characteristics of the amplifier.

4. The wireless communication system according to claim 3, further comprising:
  a communication path information acquisition circuitry configured to acquire communication path information based on a training signal for a communication path between the transmission device and the reception device; and
  a weight calculation circuitry configured to calculate a precoding weight in the precoding circuitry by using the communication path information, wherein
  the tap length control circuitry performs control for changing the tap length in the precoding circuitry each time the weight calculation circuitry calculates a precoding weight by using the communication path information.

5. A transmission device comprising:
  a precoding circuitry configured to precode a stream of a transmission signal in a time domain by using an FIR filter;
  a transmission power control circuitry configured to control a transmission power of the stream precoded by the precoding circuitry;
  an amplifier that amplifies the stream precoded by the precoding circuitry under control of the transmission power control circuitry; and
  a tap length control circuitry configured to perform control for changing a tap length in the precoding circuitry such that the tap length is decreased in a case where a magnitude of a last tap coefficient in the precoding circuitry is small and the tap length is increased in a case where the magnitude is large, with respect to a threshold value calculated on the basis of quality information of a received signal fed back from the reception device that has received the stream amplified by the amplifier or quality information of a received signal calculated by using at least characteristics of the amplifier.

6. The transmission device according to claim 5, further comprising:
  a communication path information acquisition circuitry configured to acquire communication path information based on a training signal for a communication path with the reception device; and
  a weight calculation circuitry configured to calculate a precoding weight in the precoding circuitry by using the communication path information, wherein
  the tap length control circuitry performs control for changing the tap length in the precoding circuitry each time the weight calculation circuitry calculates a precoding weight by using the communication path information.

\* \* \* \* \*